NONDESTRUCTIVE READ MEMORY SELECTION SYSTEM

Filed Aug. 16, 1965 Sheet 1 of 2

INVENTOR
JAMES H. SCHEUNEMAN
BY Thomas J. Nikolai
ATTORNEY

United States Patent Office 3,423,739 Patented Jan. 21, 1969

3,423,739

NONDESTRUCTIVE READ MEMORY SELECTION SYSTEM

James H. Scheuneman, St. Paul, Minn., assignor to Sperry Rand Corporation, New York, N.Y., a corporation of Delaware Filed Aug. 16, 1965, Ser. No. 479,999
U.S. Cl. 340—174 7 Claims
Int. Cl. G11b *5/00*

ABSTRACT OF THE DISCLOSURE

An array of thin ferromagnetic film memory elements arranged in a word-organized nondestructive readout memory selection system utilizing coincident longitudinal and transverse drive field selection for the write operation and coincident transverse drive field selection for the read operation.

*Background of the invention*

Prior art memory selection systems have been mostly electronics-limited in that large-size random-access electrically-alterable memory systems have required near prohibitive numbers of associated electronic elements such as sense amplifiers, line drivers, etc. Consequently, there has been extensive research into the field of selection systems for the determination of an optimum arrangement of selection system electronics for memory systems in the order of a million word size. Published articles such as "A 16 K-word, 2-MC, Magnetic Thin Film Memory" E. E. Bittmann, Proceedings—Fall Joint Computer Conference, 1964, pages 93 through 106, and, "Analysis of $10^8$ Element Magnetic Film Memory Systems" A. V. Pohm et al. 1964 proceedings of the Intermag Conference pages 5–3–1 through 5–3–5 have provided some insights into the problems involved with the determination of the optimum selection system for a large capacity memory, and the required reliability of the memory element to provide a large size memory at a minimum cost per memory element or bit.

The present invention is an improvement in prior art memory selection systems. Thin ferromagnetic films are utilized as the memory element. The uniaxial anisotropic characteristic of such films are utilized to overcome the present day state-of-the-art wide range of the magnetic characteristics of such elements. Present day fabrication techniques have, as yet, been unable to produce single layer thin ferromagnetic film elements having sufficiently similar characteristics, i.e., of sufficient reliability, to utilize multiple coincidence selection systems. Accordingly, multiple layer elements, such as disclosed in Patent Nos. 3,015,807, 3,125,743 and 3,095,555 have been used to provide reliable elements for such systems. Nevertheless, it is desirable that selection systems therefore be improved cost-wise. The co-pending patent application of J. P. Eckert Ser. No. 256,843 filed Mar. 18, 1963, and now abandoned discloses one improved selection system using thin ferromagnetic films as the memory element. However, such system, which is arranged in a plurality of square arrays, or groups, requires more extensive electronics for the external gating functions than is desired. The present invention overcomes the need for much of such external gating functions by using the characteristics of the individual memory element to discriminate between the fully selected element and the partially selected element.

*Summary of the invention*

The present invention in the illustrated embodiment proposes a one million word size memory system that is divided into 1024 ordered groups each of which is divided into 1024 ordered words. Each group has a separately associated group driver while all like ordered words of the 1024 groups are common coupled to a separately associated word driver. Lastly, each like ordered digit of all the words of the system are coupled to a separately associated digit driver and a separately associated sense amplifier. Therefore, the memory system requires only 1024 group drivers, 1024 word drivers and as many digit drivers and sense amplifiers as there are digits in the word; i.e., if each word is 32 digits long there would then be required only 32 digit drivers and 32 sense amplifiers. As the digit drivers and the sense amplifiers associated with each ordered digit are coupled to a common digit-sense line each memory element is coupled to only three lines; a group drive line, a word drive line and a common digit-sense line. With thin ferromagnetic film memory elements fabricated in accordance with Patent No. 2,900,282 and assembled into compact memory stacks in accordance with Patent No. 3,030,612 there is provided by the present invention a reasonably priced reliable, and compact large capacity memory store for electronic data processing systems operating in the megacycle range.

Accordingly, it is a primary object of the present invention to provide a novel memory selection system that is less expensive than prior art systems.

Another object of the present invention is to provide a novel word-organized memory system utilizing thin ferromagnetic films as the memory element and having nondestructive readout therefrom.

Another object of the present invention is to provide a selection system for a thin ferromagnetic film memory array utilizing two coincident transverse drive fields for the read operation and two coincident transverse drive fields plus one coincident longitudinal drive field for the write operation.

A further object of the present invention is to provide a large capacity memory system whereby each word may be addressed by a minimum of electronic circuitry.

These and other more detailed and specific objectives of the present invention will be disclosed in the course of the following specifications, reference being had to the accompanied drawings.

*Description of the preferred embodiment*

Figures 1, 2:
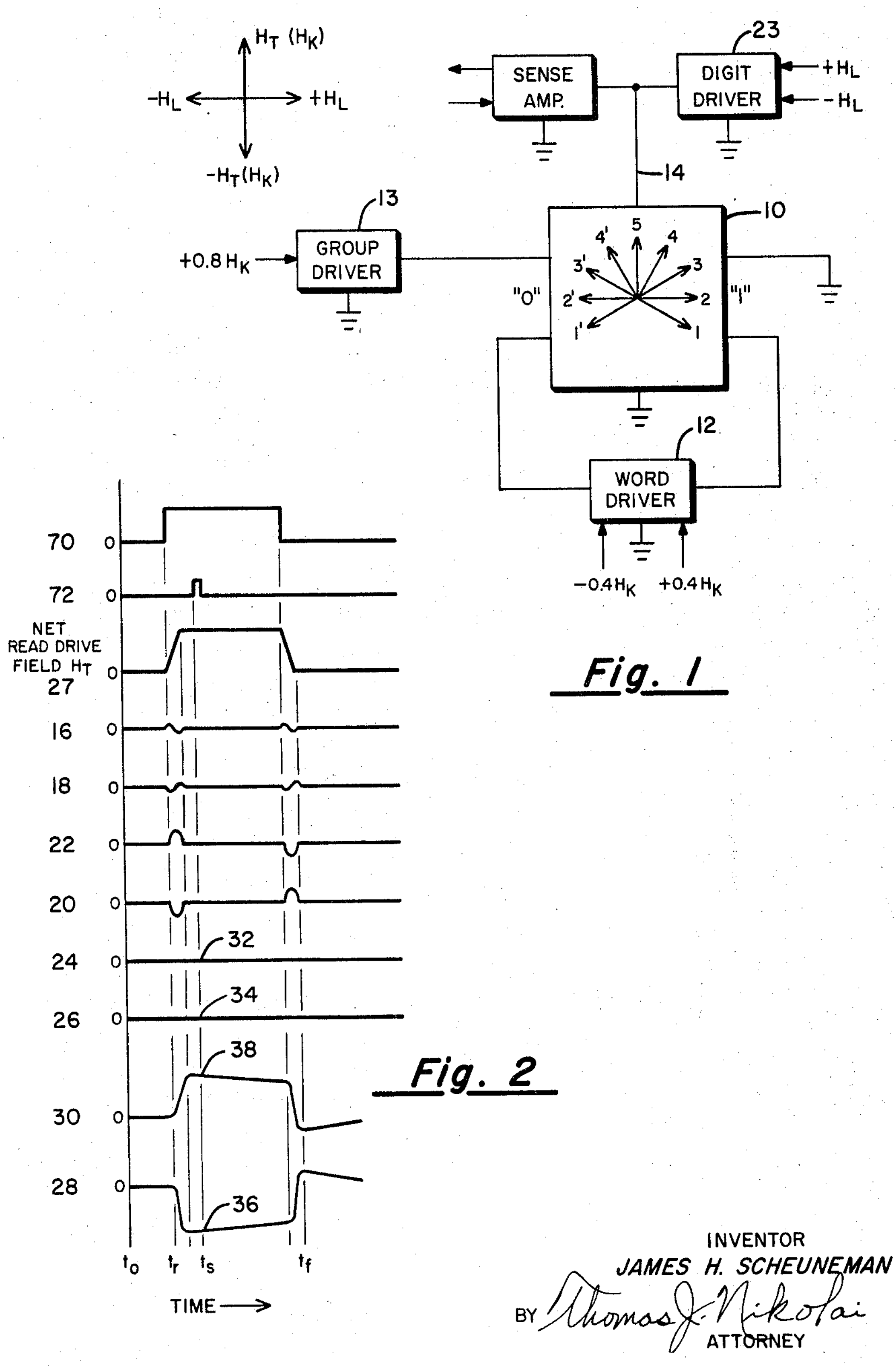
FIGURE 1 is an illustration of a thin ferromagnetic film element used in the present invention.
FIGURE 2 is an illustration of the relationships between the applied drive field, magnetic state of the element of FIGURE 1 and the output signals associated therewith.

With particular reference to FIGURE 1 there is illustrated an embodiment incorporating a thin ferromagnetic film element possessing the property of uniaxial anisotropy providing an easy axis 2–2' along which the element's remanent magnetization lies. Additionally, such element has a hard axis orthogonal to said easy axis which hard axis is substantially aligned with vector 5. Element 10 may be set into two arbitrarily defined remanent magnetic states defined as a "1" or a "0" which for purposes of the present discussion may be associated with the vector 2 of the vector 2', respectively.

The selection system of the present invention requires for the read operation, the application to element 10 of an initial transverse bias field $H_T$ of an intensity of $-0.4\ H_K$ by means of a word driver 12. This word drive field of $-0.4\ H_K$ rotates the magnetization vector of element 10 from its position along easy axis 2–2' into a biased state represented by vector 1. This assumes the magnetization of element 10 to have been set into a "1" state whereas if the magnetization of element 10 has been set into a "0" state its magnetization would have been rotated from a remanent state represented by vector 2' into a biased state represented by vector 1'. With the magnetization of element 10 biased into the state represented by vector 1 the coincident application of a transverse drive field $H_T$ of an intensity of $+0.8\ H_K$ by group driver 13 rotates the magnetization out of alignment with vector 1 into alignment with vector 3 and upon cessation of the group drive field its magnetization returns to its biased position along vector 1. This rotation of the magnetization of element 10 induces an output signal in common digit-sense line 14 represented by wave form 16—see FIG. 2—which is an output signal representative of a partially selected element 10 storing a "1." For an element 10 storing a "0" the output signal induced in common digit-sense line 14 would be of the same waveform but of opposite polarity phase—waveform 18.

For the full selection of an element 10 the initial transverse biasing field applied by word driver 12 of an intensity of $-0.4\ H_K$ would be removed. Thus, the remanent magnetization of the fully selected element 10 would reside along its easy axis 2–2'. Now, the application of a transverse group drive field $H_T$ of an intensity of $+0.8\ H_K$ by group driver 13 would cause the magnetization of element 10 to rotate from its initial state represented by vector 2 through the position represented by vector 3 into the position represented by vector 4 and, upon the termination of the group drive field, would return to its initial state along vector 2. This rotation of the magnetization of element 10 under the influence of a group drive field from group driver 13 of an intensity of $+0.8\ H_K$ would induce a full select signal 20 in common digit-sense line 14. If element 10 had stored a "0" rather than the above described "1" the full select signal induced in line 14 would have been of the same waveform as that of output signal 20 but of opposite polarity phase—waveform 22.

It is apparent that if neither word driver 12 nor group driver 13 had coupled their respective drive fields to element 10 the magnetization of element 10 would have remained oriented along easy axis 2–2' inducing no signal in line 14.

For the writing of a "1" or "0" into element 10 there is required the coincident application of a transverse group drive field $H_T$ of $+0.8\ H_K$ by means of group driver 13, a transverse word drive field $H_T$ of $+0.4\ H_K$ by means of word driver 12 and a + or − longitudinal digit drive field $H_L$ by digit driver 23. For the write operation word driver 12 does not couple a bias inhibit drive field of an intensity of $-0.4\ H_K$ as in the above discussed initial read operation. Instead, for the write operation word driver 12 couples a transverse bias field of an intensity of $+0.4\ H_K$ to element 10 causing the magnetization of element 10 to rotate out of its remanent position along easy axis 2–2' into the position represented by vector 3 or 3' depending on whether the magnetization of element 10 was previously set into a "1" or a "0" state. Next, group driver 13 couples a transverse group drive field of an intensity of $+0.8\ H_K$ to element 10 causing the magnetization thereof to become aligned along its hard axis as represented by vector 5. Next, digit driver 23 couples a longitudinal digit drive field $H_L$ to element 10 of a positive or a negative polarity for the storage of a "1" or a "0," respectively. The concurrent application of the group drive field and the word drive field produces a net transverse drive field $H_T$ of an intensity of $+1.2\ H_K$ which as described above orients the magnetization of element 10 along its hard axis along vector 5. The coincident application of a small intensity longitudinal steering field $H_L$ at the time the magnetization of element 10 is aligned along its hard axis biases the magnetization thereof away from such hard axis such that when the net transverse drive field $H_T$ provided by the group driver and the word driver is removed the longitudinal drive field, provided by the digit driver, steers the magnetization of element 10 into an orientation represented by vector 2 representative of a stored "1" or into a position represented by vector 2' representative of a stored "0."

The above discussion relating to FIGS. 1 and 2 has been presented for a detailed explanation of the internal gating feature provided by the thin ferromagnetic film element utilized by the present invention. However, such discussion does not point up the advantages inherent in such arrangement when incorporated into a memory system of the order of a million words. With particular respect to FIGURE 3 there is presented an illustration of a memory system having over a one million word capacity and incorporating the inventive concept of the present invention. Memory system 40 is comprised of 1024 groups numbered G–1 through G–1024, each group having 1024 words numbered W–1 through W–1024 each of 32 digits in length of the general form $D_n$–1, $D_n$–2 . . . $D_1$, $D_0$ where $D_0$ is the lowest ordered digit and $D_n$–1 is the highest ordered digit; G groups, each of W words, each of D digits. Thus, there is provided a memory system having GW words each of D digits for a total of GWD digits which in the illustrated embodiment is a total of 33,554,-432 digits. This embodiment requires; 1024 group drivers numbered GD–1–GD–1024, a separate group driver is associated with each separate groups; 1024 word drivers numbered WD–1–WD–1024, a separate word driver is associated with each like ordered word of all groups, i.e., word driver WD–1 is coupled to all digits of the like ordered word W1 of groups G1–G1024; 32 digit drivers numbered DD–1–DD–32, and 32 sense amplifiers numbered SA–1–SA–32, a separate pair of a like ordered sense amplifier and digit driver is associated with each like ordered digit of all words of all groups, i.e., sense amplifier SA–1 and digit driver DD–1 are coupled to all like ordered digits $D_{n-1}$ of all the words of memory system 40.

Figure 3:
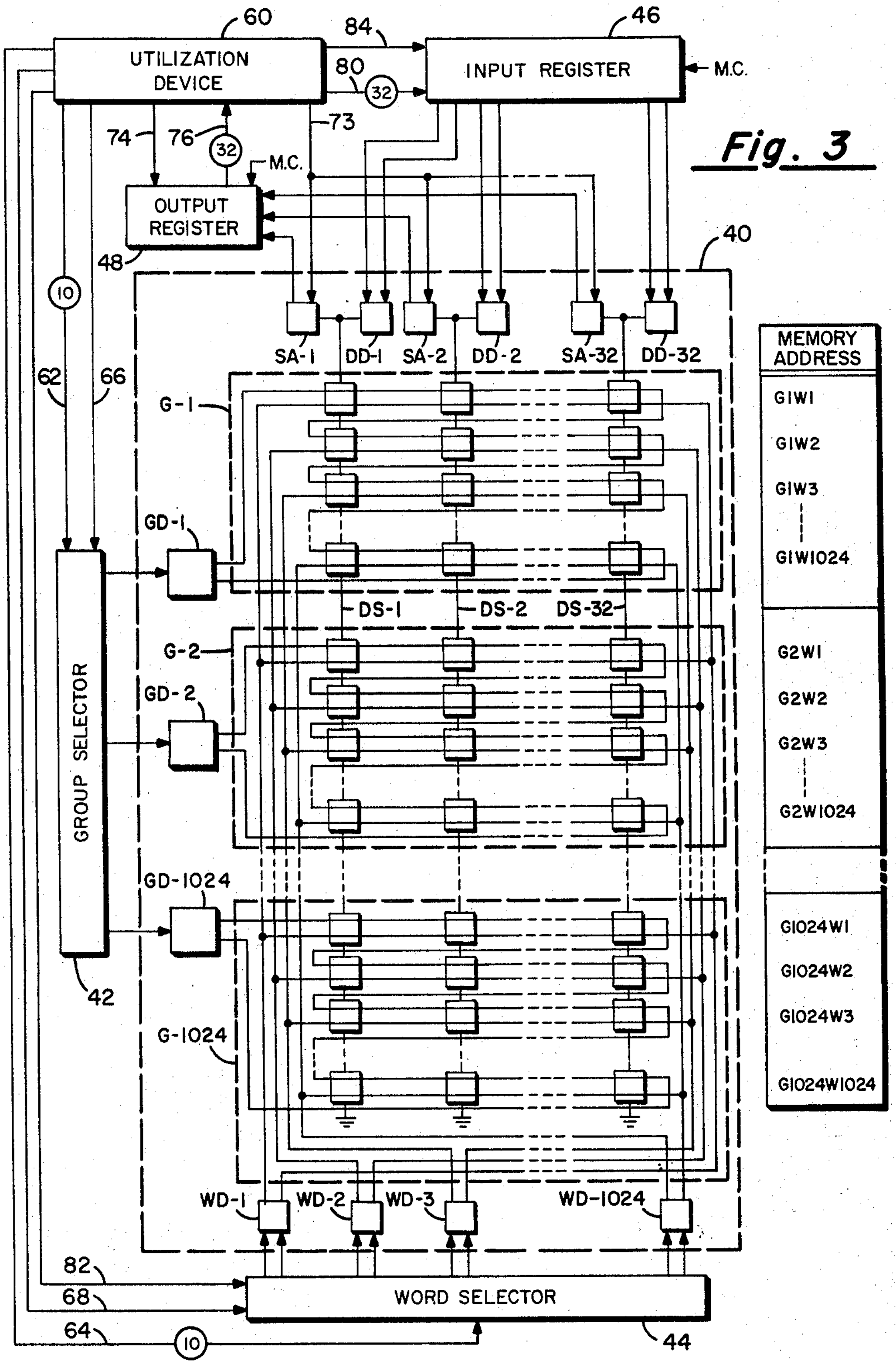
FIGURE 3 is an illustration of a 1024 group, 1024 words per group, 32 digits per word memory system incorporating the present invention.

In a recapitulation of the previous discussion with respect to FIGURE 1 and as related to the illustrated embodiment of FIGURE 3, the operation of memory selection system 40 consists of the following operations:

(1) Assume an initial condition of all control circuitry OFF with all memory elements established in their previously set magnetic states of "1" or "0" (vector position 2 or 2', respectively, see FIGURE 1).

(2) Power to memory selection system 40 is turned ON. At this time the following conditions exist, (a) All digit drivers are OFF.
(b) All group drivers are OFF.
(c) All word drivers are ON, and couple a transverse bias inhigit drive field of $-0.4\ H_K$ to all memory elements of selection system 40 setting their magnetization into an initial biased vector position 1 (or 1').

(3) A read operation is designated.

(a) The word driver associated with the fully selected word (the word that is to be read out) is turned OFF permitting the magnetization of the affected memory elements to return to their remanent states of vector 2 (or 2').
(b) The group driver associated with the group in which the fully selected word lies is turned ON coupling a transverse group drive field of $+0.8\ H_K$ to all the words of that group. All the memory elements of the fully selected word are subjected to a net transverse drive field of $+0.8\ H_K$ causing the magnetization thereof to rotate through vector positions 2–4–2 (or 2'–4'–2').
(c) All the memory elements of the partially selected words of the selected group (all words of the selected group except the fully selected word) are subjected to a net transverse drive field of $+0.4\ H_K$ ($+0.8\ H_K$ group drive plus $-0.4\ H_K$ word drive) causing the magnetization thereof to rotate through vector positions 1–3–1 (or 1''–3'–1').
(d) All other memory elements are subjected to a constant transverse bias inhibit word drive field of $-0.4$ $H_K$, and, accordingly, remain in their initially biased vector position 1 (or 1').

(e) The fully selected word memory elements per 3(b) above induce a signal in their associated digit-sense line:

(1) Signal 20 indicative of a fully selected stored "1."

(2) Signal 22 indicative of a fully selected stored "0."

(f) The partially selected word memory elements per 3(c) above induce a signal in their associated digit-sense line;

(1) Signal 16 indicative of a partially selected stored "1."

(2) Signal 18 indicative of a partially selected stored "0."

(g) All other memory elements not being subjected to a changing drive field induce no signal in their associated digit-sense line.

(4) A write operation is designated.

(a) The word driver associated with the fully selected word (the word address into which the multibit input word is to be written) is caused to couple a transverse word drive field of $+0.4$ $H_K$ to all the memory elements associated therewith causing the magnetization of the affected memory elements to rotate from their previously initial biased vector position 1 (or 1') into a preparatory write, biased vector position 3 (or 3').

(b) The group driver associated with the group in which the fully selected word lies is turned ON coupling a transverse group drive field of $+0.8$ $H_K$ to all the words of that group. All the memory elements of the fully selected word are then subjected to a net transverse drive field of $+1.2$ $H_K$ causing the magnetization thereof to rotate through vector positions 3–4–5 (or 3'–4'–5') causing the magnetization thereof to become aligned along their hard axis represented by vector 5.

(c) All the memory elements of the partially selected words of the selected group (all words of the selected group except the fully selected word) are subjected to a net transverse drive field of $+0.4$ $H_K$ ($+0.8$ $H_K$ group drive plus $-0.4$ $H_K$ word drive) causing the magnetization thereof to rotate through vector positions 1–2 (or 1'–2'–3').

(d) All other memory elements are subjected to the constant transverse bias inhibit word drive field of $-0.4$ $H_K$ and, accordingly, remain in their initially biased vector position 1 (or 1').

(e) All digit drivers are turned ON coupling a longitudinal steering drive field ($+H_L$ for the writing of a "1" or $-H_L$ for the writing of a "0") to their associated digit-sense lines. This longitudinal write drive field of $+H_L$ or $-H_L$ is of just sufficient intensity to steer, or bias, the magnetization vectors set into vector position 5 per 4(b) above away from vector position 5 such that the subsequent removal or termination of the transverse drive field per 4(f) below permits the magnetization of such affected memory elements to assume a "1" or a "0" in accordance with the respectively coupled longitudinal digit drive fields of $+H_L$ or $-H_L$, respectively.

(f) While the digit drivers per 4(e) above, are still ON, the selected word driver and the selected group driver are turned OFF permitting the magnetization of the fully selected memory elements to be steered into their selected remanent states of vector position 2 or 2' representative of a "1" or a "0," respectively. Alternatively, the selected group driver may be turned OFF and the selected word driver may be left ON but caused to couple a transverse drive field of $-0.4$ $H_K$ to the associated memory elements causing all the memory elements of system 40 to assume an inital biased vector position 1 (or 1').

With particular reference to the illustrated embodiment of FIGURE 3 there is presented, as dicussed above, a memory selection system 40 consisting of 1024 groups of 1024 words of 32 digits in length. System 40 has as peripheral controls and input-output means; group selector 42, word selector 44, input register 46 and output register 48; all of which are state-of-the-art devices and form no part of the inventive concept of the present invention.

Group selector 42 serves the function of receiving a multibit digital word of a sufficient number of places (10 in the illustrated embodiment) to decode and select one out of the G groups (1024 in the illustrated embodiment) of system 40 whereby the selected group driver is enabled causing it to couple a transverse group drive field of the proper intensity ($+0.8$ $H_K$ in the illustrated embodiment) to all the elements of the selected group (1024 words$\times$32 bits per word=32,768 elements).

Word selector 44 serves the function of receiving a multibit digital word of a sufficient number of places (10 in the illustrated embodiment) to decode and select one out of the G like ordered words (1 like ordered word in each of the 1024 groups of the illustrated embodiment) of system 40 whereby the selected word driver is enabled causing it to couple a transverse word drive field of the proper intensity (0.0 $H_K$ for a read operation and $+0.4$ $H_K$ for a write operation in the illustrated embodiment) to all the elements of the selected words (1024 words$\times$32 bits per word=32,768 elements) and the nonselected word drivers (1024 total word drivers−1 selected word driver=1023 nonselected word drivers) are enabled causing them to couple a transverse bias inhibit word drive field of the proper intensity ($-0.4$ $H_K$ in the illustrated embodiment) to all the elements of the nonselected words (1024 word drivers−1 selected word driver=1023 nonselected word drivers; 1023 nonselective word drivers$\times$1024 words per word driver$\times$32 bits per word=1,047,552 elements). Additionally, word selector 44 may itself be enabled or disabled whereby it is able or not able, respectively, to couple the respective control signals to the associated word drivers.

Input register 46 and output register 48 may be conventional flip-flop storage registers for the temporary storage, or holding, of the multibit words that are to be written into or that are to be read out of, respectively, system 40. Input register 46 serves the function of receiving and holding the multibit word that is to be written into system 40 and couples appropriate control signals, representative of a stored "1" or "0," to the associated digit drivers when enabled via appropriate control signals. Such digit drivers when enabled by input register 46 coupled longitudinal drive fields of the proper intensity ($+H_L$ or $-H_L$ for the writing of a "1" or a "0," respectively, in the illustrated embodiment) which when properly combined with the coincident application of the proper intensity transverse word and group drive fields cause the elements of the fully selected word of system 40 to be set into a stored "1" or "0."

Output register 48 serves the function of receiving and holding the multibit word that was read out of the fully selected word of system 40 when enabled to receive such signals via appropriate control signals. Both registers 46 and 48 are capable of being master cleared, when desired, to hold all "0's."

Word drivers WD–1–WD–1024 and digit drivers DD–1–DD–32 may be of any well known bidirectional current drive arrangement that is capable of providing a current drive signal of the proper intensity ($+0.4$ $H_K$ or $-0.4$ $H_K$, word drivers; $+H_L$ or $-H_L$; digit drivers; in the illustrated embodiment) to the associated memory elements. Group drivers GD–1–GD–1024 may be of any well known unidirectional current drive arrangement that is capable of providing a current drive signal of the proper intensity ($+0.8$ $H_K$ in the illustrated embodiment) to the memory elements of the associated group.

Sense amplifiers SA–1–SA–32 may be of any well known gated, integrating sense amplifier design whereby the composite output signal that is induced in the coupled sense line is integrated to accomplish a self cancelling of bipolar signals; this produces an amplified output signal that is substantially a function of the unipolar input signal component. The amplified output signal is then, after a suitable delay period to permit stabilization of the output signal, gated or strobed by a strobe pulse to permit the coupling of the amplified output signal to the output register only during the strobe period. Sense amplifiers SA–1–SA–32 accept; waveforms 16 and 18 representative of the output signals induced in the common digit-sense line 14 that are representative of a partially selected "1" and "0," respectively, providing integrated signals 24 and 26 thereof, respectively; wave forms 20 and 22 representative of the output signals induced in the common digit-sense line 14 that are representative of a fully selected "1" and "0," respectively, providing integrated signals 28 and 30 thereof, respectively. When such sense amplifiers are strobed at a time $t_s$ that is a suitable delay period after the initiation of the read drive field 27 at a time $t_r$—see FIG. 2—the integrated signals strobed and emitted therefrom to be coupled to the respectively associated ordered digit stage of the output register 48 produce the insignificant signal levels of points 32 and 34 representative of a partially selected "1" and "0," respectively, and the significant signal levels points 36 and 38 representative of a fully selected "1" and "0," respectively.

With particular respect to FIGURE 3 there is illustrated memory selection system 40 and the necessary peripheral equipment and controls for the proper implementation of the present invention. As is well known in the electronic data processing field memory selection system 40 is normally an integral part of a central processor. However, for purposes of the present discussion utilization device 60 may be considered to include a digital computer with programmable controls, storage, and input-output control means for the control of and communication with the externally located equipment illustrated in FIGURE 3. For purposes of describing an exemplary operation of the illustrated embodiment of FIGURE 3 it may be assumed that the array of memory elements included in system 40 is loaded with information of a binary form as is well known in random-access electrically-alterable memory systems associated with central processors of the digital type. Additionally, it may be assumed that group selector 42 and word selector 44 are disabled thereby coupling no signals to their associated group drivers or word drivers, respectively, and that input register 46 and output register 48 have been master cleared to contain all "0's."

Assuming that a read operation has been designated by utilization device 60, utilization device 60 couples signal representations of a 10 bit group select word to group selector 42 by means of line 62 and of a 10 bit word select word to word selector 44 by means of line 64. At this time group selector 42 has, through its selection matrix, translated the 10 bit group select word determining what group driver of the 1024 group drivers associated therewith is to be subsequently enabled by the enabling of group selector 42 by the coupling thereto, by means of line 66, of a suitable enable pulse. Likewise, word selector 44 has, through its selection matrix, translated the 10 bit word select word determining what word driver of the 1024 word drivers associated therewith is to be subsequently disabled by a signal coupled thereto by way of line 68. However, word selector 44, by the action of the coupling thereto of the word, select word is caused to couple appropriate control signals to word drivers WD–1–WD–32 causing such word drivers to couple initial transverse bias inhibit drive fields of an intensity of $-0.4\ H_K$ to all the memory elements of system 40. Next, utilization device 60 couples coincident signals to group selector 42 by way of line 66 and to word selector 44 by way of line 68. These coincident signals cause group selector 42 to enable the selected group driver causing it to couple a transverse group drive field of an intensity of $+0.8\ H_K$ to all the memory elements of the selected group that is associated with the selected group driver, and cause word selector 44 to disable the selected word driver causing it to couple a zero intensity transverse word drive field to all the memory elements of the selected words that are associated with the selected word driver. At this time the fully selected word, i.e., that word that is common to the selected group driver and word driver, is effected by a net transverse drive field of an intensity of $+0.8\ H_K$, which net transverse drive field causes the magnetization of the memory elements of the fully selected word to rotate through vector positions 2–3–4–3–2 or 2′–3′–4′–3′–2′ inducing in the coupled digit-sense line waveforms 20 or 22 indicative of a stored "1" or "0."

Assuming the multibit group select word that is coupled to group selector 42 to be 0000000001, with the lowest ordered digit as discussed above being the right-most digit, this multibit word would be translated by group selector 42 as selecting group driver GD–2 which is the group driver that is associated with group 2 of system 40. Assuming further, that the multibit word select word that is coupled to word selector 44 to be 0000000010, this multibit word would be translated by word selector 44 as selecting word driver WD–3 which is the word driver that is associated with all like ordered words W3 of system 40. Accordingly, the specified word that is to be fully selected thereby would be group 2 ordered word 3, designated G2W3. At an appropriate time, such as time $t_r$ of FIG. 2, both group selector 42 and word selector 44 would be enabled by an enable pulse 70 coupled thereto by means of enable lines 66 and 68, respectively, causing group selector 42 and word selector 44 to select the selected group driver GD–2 and word driver WD–3, respectively. Such selected drive means would affect the associated memory elements of G2W3 by a net transverse read drive field of $+0.8\ H_K$ inducing in digit=sense lines DS–1 through DS–32 the signal wave forms 16, 18, 20 and 22 of FIG. 2 that are representative of the informational content of the associated memory elements. At a sufficient delay time after time $t_r$, such as time $t_s$, utilization device 60 simultaneously couples a sense amplifier strobe pulse 72 to sense amplifiers SA–1 through SA–32 by way of line 73 whereby the signal levels 32, 34, 36 and 38 of integrated and amplified wave forms 16, 18, 20 and 22, respectively, are coupled by the associated sense amplifier output lines to the correspondingly ordered stages of output register 48 causing output register 48 to store the multibit word stored in memory word G2W3 of system 40. After the cessation of the net read drive field ($H_T$ wave form 27 of FIG. 2) as determined by the termination of enable pulse 70, all group drivers GD–1 through GD–1024 return to their initial OFF state thereby coupling no effective group drive field to any of the memory elements of system 40. Additionally, the disabling of word selector 44, upon the termination of enable pulse 70 on line 68, reinitiates its prior output state whereby word selector 44 couples appropriate control signals to word drivers WD–1 through WD–1024 causing all such word drivers to couple an effective transverse bias inhibit drive field of an intensity of $-0.4\ H_K$ to all the memory elements of system 40.

At this time utilization device 60 may couple an appropriate enable pulse to output register 48 by means of line 74 whereby output register 48 is caused to couple the signal representations of the multibit word that is stored therein to utilization device 60 by means of output line 76.

For a discussion of a write operation performed by system 40 of FIG. 3 assume that the word previously read out, designated G2W3, is now to be rewritten to conform to a multibit word held in input register 46. With group selector 42 and word selector 44 in the operating condition as established by the termination of the previously described read operation, preparatory to the write operation utilization device 60 couples signal representations of the 32 bit input word to input register 46 by means of input line 80 whereby input register 46 is caused to store the multibit input word that is to be written into the fully selected word of system 40. Next, utilization device 60 couples a write enable pulse to word selector 44 by means of line 82 whereby the selected word driver WD–3 is caused to couple an effective transverse word drive field of an intensity of $+0.4\ H_K$ to all the memory elements associated therewith. As before, all other word drivers WD–1, WD–2 and WD–4 through WD–1024 are coupling an effective transverse bias inhibit word drive field of an intensity of $-0.4\ H_K$ to all the remaining memory elements of system 40. Concurrently, with the selection of word driver WD–3, group selector 42 is enabled by an enable pulse by means of line 66 whereby the selected group driver GD–2 is caused to couple an effective transverse group drive field of $+0.8\ H_K$ to all the memory elements of group 2. At this time only those memory elements associated with the word designated G2W3 are effected by a substantial effective transverse drive field of $+1.2\ H_K$ causing the magnetization thereof to become substantially aligned along their hard axes. Next, utilization device 60 couples an enable pulse to input register 46 by means of line 84 whereby signal representations of the 32 bit input word held in input register 46 are coupled to their respectively associated digit drivers DD–1 through DD–32 causing such digit drivers to couple a $+H_L$ or $-H_L$ steering field to their respectively associated digit-sense lines DS–1 through DS–32. These positive or negative steering fields representative of a "1" or a "0" are, as previously described, of just sufficient intensity to bias the magnetization of the memory elements of the fully selected word, designated G2W3, away from their previously established orientation along their respective hard axes whereby the subsequent removal of the coupled effective transverse drive field will permit the magnetization of such memory elements to relax into a first or a second and opposite direction along their respective easy axes representative of a stored "1" or "0." Next, while the longitudinal steering digit drive field $H_L$ is applied, the effective transverse drive fields coupled thereto are removed by the removal of the enable pulses coupled to group selector 42 and word selector 44. While word selector 44 at this time may be causing an effective transverse bias inhibit word drive field of an intensity of $-0.4\ H_K$ to be coupled to all the memory elements of system 40, including those memory elements associated with the fully selected word designated G2W3, such associated memory elements of the designated word would assume biased positions substantially oriented along their respective easy axes such as that of vector position 1 or 1' as previously discussed with respect to the operation of FIG. 1. With all power removed from memory system 40 the group drivers, word drivers and digit drivers thereof would couple no effective drive field to any of the memory elements associated therewith permitting the magnetization of such memory elements to reside at an unbiased remanent magnetic state along their easy axes in a first or a second and opposite direction of vector positions 2 or 2' representative of a stored "1" or "0," respectively, corresponding to the respectively ordered digits of the previously written words.

Although the illustrated embodiment of FIG. 3 is depicted as a square memory system, i.e., there are as many groups as there are words of a group, such is not to be construed as a limitation thereto. It is apparent from an inspection of the illustrated embodiment and a consideration of the description of the operation thereof that the number of groups and number of words per group are two completely independent parameters that may be varied as the memory system capacity requires. As an example, for purposes of optimizing the selection matrices in group selector 42 and word selector 44 it is desirable that such matrices are limited to the requirement of selecting one out of $2^n$ drivers, where $n$ is a positive integer. Additionally, as the design of group selector 42 and word selector 44 is substantially independent of the bit length of the words held in memory system 40 it is also apparent that by the mere quadrupling of the number of sense amplifiers and digit drivers it is possible to quadruple the total number of memory elements or memory capacity thereof. As an example of the above, when used with a central processor using words of a 32 bit length it is possible to quadruple the effective length of output register 48, input register 46 and the words of system 40 and by providing suitable enabling and disabling of selected portions of input register 46 and output register 48 it is possible to operate upon any selected 32 bit word portion of any one of the so formed 128 bit words held in the quadrupled word length of system 40. Additionally, instead of the illustrated arrangement whereby each digit-sense line serially couples all the like ordered digits of all the words of system 40 such digit-sense line may be parallel coupled to each or selected pluralities of each of the groups thereof. Additionally, when desired, separate sense and digit lines may be utilized in place of the common digit-sense line arrangement of the illustrated embodiment. Further, although the operation of the illustrated embodiment of FIG. 1 has been described using drive field of certain specified intensities such is not to be construed as a necessary limitation to the proper operation of the inventive concept embodied therein. Such specified drive field intensities are functions of the magnetic characteristics of the particular memory elements utilized, and, accordingly, will vary therewith.

The illustrated embodiment of FIG. 3 is depicted as having the group driver of each group serially couple all the elements thereof by means of a group drive line that serially couples all the elements of one word, doubles back, and then serially couples all the elements of the second word and so on through all the words of the group. This arrangement provides word drive fields of the same orientation (as in FIG. 1) whereby all word drivers may provide drive fields of the same orientation. However, the group drive line may double back through the next following ordered word. This arrangement would require word drive fields of alternate orientation; the elements of the odd numbered words would have their magnetization oriented as in FIG. 1 while the elements of the even numbered words would have their magnetization oriented in a reversely downward direction opposite to vector 5. This arrangement would require that the word drivers associated with the odd numbered words provide likewise reversed word drive fields to combine properly with the reversed group drive fields. Readout signals would be uneffected by such change.

Thus, it is apparent that there has been described herein a preferred embodiment of the present invention that provides a novel memory selection system utilizing a minimum of selection electronics for a maximum of storage capacity.

It is understood that suitable modifications may be made in the structure as disclosed provided such modifications come within the spirit and scope of the appended claims. Having now, therefore, fully illustrated and described my invention, what I claim to be new and desire to protect by Letters Patent is set forth in the appended claims.

What is claimed is:

1. A memory selection system, comprising:

G groups each of W ordered words each of D digits in length; each of said digits comprising a thin ferromagnetic film element possessing single domain properties and having the property of uniaxial anisotropy providing an easy axis along which its remanent magnetization shall lie and a hard axis orthogonal to said easy axis;

G group drivers each coupled to all the words of only an associated group;

W word drivers each coupled to only the like ordered word of all groups;

D digit drivers each coupled to only the like ordered digit of each word of the system;

each of said group drivers coupling a first polarity group drive field transverse the easy axes of the elements of all the words of the associated group;

each of said word drivers coupling a first polarity word drive field transverse the easy axes of the elements of the like ordered word of all said groups;

each of said digit drivers coupling a first or second and opposite polarity digit drive field longitudinal the easy axis of the element of the like ordered digit of all the word of the system;

D sense amplifiers each coupled to only the like ordered element of all the words of the system;

means coincidently coupling a word drive field and a group drive field to the elements of a common coupled word and a digit drive field of a first or second and opposite polarity to a common coupled element of said common coupled word for causing the magnetization of only such common coupled elements of said common coupled word to be set into a first or second and different binary state along their easy axes representative of the polarity of the respectively coupled digit drive field.

2. A memory selection system, comprising:

G groups each of W ordered words each of D digits in length;

each of said digits comprising a thin ferromagnetic film element possessing single domain properties and having the property of uniaxial anisotropy providing an easy axis along which its remanent magnetization shall lie and a hard axis orthogonal to said easy axis;

G group drivers each coupled to all the words of only an associated group;

W word drivers each coupled to only the like ordered word of all groups;

D digit drivers each coupled to only the like ordered digit of each word of the system;

each of said group drivers coupling a first polarity group field transverse the easy axes of the elements of all the words of the associated group;

each of said word drivers coupling a first polarity word or a second polarity inhibit drive field transverse the easy axes of the elements of the like ordered word of all said groups;

each of said digit drivers coupling a first or second and opposite polarity digit drive field longitudinal the easy axis of the element of the like ordered digit of all the words of the system;

D sense amplifiers each coupled to only the like ordered element of all the words of the system;

means causing the coincident coupling of a word drive field and of a group drive field of said first polarity to the elements of a common coupled word and of a digit drive field of a first or second and opposite polarity to a common coupled element of said common coupled word for causing the magnetization of only such common coupled elements of said common coupled word to be set into first or second and different binary states along their easy axes representative of the polarity of the respectively coupled digit drive field.

3. A memory selection system, comprising:

G groups each of W ordered words each of D digits in length;

G group drivers each coupled to all the words of only an associated group;

W word drivers each coupled to only the like ordered word of all groups;

D digit drivers each coupled to only the like ordered digit of each word of the system;

each of said group drivers coupling a group drive field to all the words of the associated group;

each of said word drivers coupling a word drive field to the like ordered word of all said groups;

each of said digit drivers coupling a digit drive field to the like ordered digit of all the words of the system;

D sense amplifiers each coupled to only the like ordered digit of all the words of the system;

the coupling of a coincident word drive field and group drive field to a common coupled word and of a digit drive field of a first or second and opposite polarity to a common coupled digit of said common coupled word for causing such common coupled digits to be set into a first or second and different binary state representative of the polarity of the respectively coupled digit drive field.

4. A memory selection system, comprising:

G groups each of W ordered words each of D digits in length;

G group drivers each coupled to all the words of only an associated group;

W word drivers each coupled to only the like ordered word of all groups;

D digit drivers each coupled to only the like ordered digit of each word of the system;

each of said group drivers coupling a group drive field to all the words of the associated group;

each of said word drivers coupling a word drive field to the like ordered word of all said groups;

each of said digit drivers coupling a digit drive field to the like ordered digit of all the words of the system;

D sense amplifiers each coupled to only the like ordered digit of each word of the system;

means coincidently coupling a word drive field and a group drive field to a common coupled word and a digit drive field of a first or second and opposite polarity to the common coupled digits of said common coupled word for causing only such common coupled digits of said common coupled word to be set into a first or second and different binary state representative of the polarity of the respectively coupled digit drive field.

5. A memory selection system, comprising:

a plurality of groups each of an equal number of like ordered words each of an equal number of like ordered digits;

each of said digits comprising a thin ferromagnetic film element possessing single domain properties and having the property of uniaxial anisotropy providing an easy axis along which its remanent magnetization shall lie and a hard axis orthogonal to said easy axis;

a plurality of group drivers each coupled to all the words of only an associated group;

a plurality of word drivers each coupled to only the like ordered word of all groups;

a plurality of digit drivers each coupled to only the like ordered digit of each word of the system;

a plurality of sense amplifiers each coupled to only the like ordered digit of each word of the system;

all but one of said word drivers enabled for coupling an inhibit drive field to the associated elements and transverse their easy axes;

only one of said group drivers enabled for coupling a group drive field to the associated elements and transverse their easy axes;

the magnetization of the elements of only the one word that is common to said enabled group driver and said one not enabled word driver caused to be rotated out of their remanent states along their easy axes causing a substantially unipolar signal of a first or second polarity to be coupled to each of the associated sense amplifiers which signal polarity is representative of the remanent states of the respectively associated elements.

6. A memory selection system, comprising:

a plurality of groups each of an equal number of like ordered digits, each of said digits comprising at least one thin ferromagnetic film element possessing single domain properties and having the property of uniaxial anisotropy providing an easy axis along which its remanent magnetization shall lie and a hard axis orthogonal to said easy axis;

a plurality of group drivers each coupled to all the words of only an associated group;

a plurality of digit drivers each coupled to only the like ordered word of all groups;

a plurality of digit drivers each coupled to only the like ordered digit of each word of the system;

a plurality of sense amplifiers each coupled to only the like ordered digit of each word of the system;

all but one of said word drivers enabled for coupling a first polarity inhibit drive field to the associated elements and transverse their easy axes;

only one of said group drivers enabled for coupling a first polarity word drive field to the associated elements and transverse their easy axes;

the magnetization of the elements of only the one word that is common to said enabled group driver and said one not enabled word driver caused to be rotated out of their remanent states along their easy axes substantially toward their hard axes for causing a signal to be coupled to each of the associated sense amplifiers that is representative of the remanent states of the respectively associated elements.

7. A memory selection system, comprising:

a plurality of groups each of an equal number of like ordered words each of an equal number of like ordered digits;

each of said digits comprising at least one thin ferromagnetic film element possessing single domain properties and having the property of uniaxial anisotropy providing an easy axis along which its remanent magnetization shall lie and a hard axis orthogonal to said easy axis;

a plurality of group drivers each coupled to all the words of only an associated group;

a plurality of word drivers each coupled to only the like ordered word of all groups;

a plurality of digit drivers each coupled to only the like ordered digit of each word of the system;

a plurality of sense amplifiers each coupled to only the like ordered digit of each word of the system;

all but one of said word drivers enabled for coupling an inhibit drive field to the associated elements and transverse their easy axes;

only one of said group drivers enabled for coupling a group drive field to the associated elements and transverse their easy axes;

the magnetization of the elements of only the one word that is common to said enabled group driver and said one not enabled word driver caused to be rotated out of their remanent states along their easy axes causing a signal to be coupled to each of the associated sense amplifiers that is representative of the remanent states of the respectively associated elements.

References Cited

UNITED STATES PATENTS

| | | | |
|---|---|---|---|
| 2,902,677 | 9/1959 | Counihan | 340—174 |
| 3,027,546 | 3/1962 | Howes et al. | 340—174 |
| 3,126,529 | 3/1964 | Hempel | 340—174 |
| 3,141,155 | 7/1964 | Vinal | 340—174 |
| 3,161,860 | 12/1964 | Grooteboel | 340—174 |

STANLEY M. VRYNOWICZ, Jr., *Primary Examiner.*

J. F. BREIMAYER, *Assistant Examiner.*

UNITED STATES PATENT OFFICE
CERTIFICATE OF CORRECTION

Patent No. 3,423,739 January 21, 1969

James H. Scheuneman

It is certified that error appears in the above identified patent and that said Letters Patent are hereby corrected as shown below:

Column 13, line 5, after "ordered" insert -- words each of an equal number of like ordered --, line 13, "digit" should read -- word --.

Signed and sealed this 17th day of March 1970.

(SEAL)
Attest:

Edward M. Fletcher, Jr.
Attesting Officer

WILLIAM E. SCHUYLER, JR.
Commissioner of Patents